United States Patent [19]

Gergoe

[11] 4,076,301
[45] Feb. 28, 1978

[54] VEHICLE TAILGATE

[75] Inventor: Bela Gergoe, Birmingham, Mich.

[73] Assignee: General Motors Corporation, Detroit, Mich.

[21] Appl. No.: 764,867

[22] Filed: Feb. 2, 1977

[51] Int. Cl.² .............................................. B60J 5/00
[52] U.S. Cl. ................................... 296/50; 296/57 R; 292/216; 16/147
[58] Field of Search ...................... 296/50, 57 R, 57 A; 49/192, 193; 16/147; 292/48, 216, 336.3

[56] References Cited

U.S. PATENT DOCUMENTS

| 3,454,299 | 7/1969 | Hewitt | 296/50 |
| 3,592,504 | 7/1971 | Sandor | 296/50 |

Primary Examiner—Philip Goodman
Attorney, Agent, or Firm—K. H. MacLean, Jr.

[57] ABSTRACT

A tailgate for a conventional station wagon type vehicle supported by a biaxial multi-hinge and a pair of hinge-latches for opening movement about a substantially vertical axis, as a door, or about a substantially horizontal axis, as a drop gate. A main latch assembly is provided to release the door for opening movement and to simultaneously release one of the two multi-hinges. A release mechanism is provided including a handle-actuated lever which is free to pivot without releasing the main latch mechanism when a selectively set lock means is in a locked condition. When the lock means is in the unlocked condition, movement of the handle-actuated lever rotates the latch release mechanism to open the tailgate in the door mode of operation with the tailgate window up or down.

4 Claims, 7 Drawing Figures

VEHICLE TAILGATE

This invention concerns an improved main-latch assembly for a vehicle tailgate and, specifically, a main latch with selective lock means to permit opening of the tailgate in a door mode by actuation of an external handle when in an unlocked condition but which allows the door handle to "freewheel" without opening the door when in a locked condition.

The tailgate is supported for pivotal movement about either vertical or horizontal axes by a biaxial multi-hinge and one of two separately releasable hinge-latches. For a similar tailgate having the above-identified hinge components, reference is made to U.S. Pat. No. 3,592,504 to Sandor which issued July 13, 1971. In the Sandor patent, which is incorporated by reference herein, a dual action tailgate is disclosed and fully described. Specifically, a main latch assembly is disclosed for initiating opening movement of the tailgate and selectively releasing one of the two hinge-latches. The Sandor embodiment is different in several respects. It requires lowering of the tailgate window to the fully down or open position before the tailgate can be opened in either a door mode or a dropgate mode. Actuation for tailgate operation in either mode is by handle mean accessible only when the window is lowered. Thus, the window position provides a tailgate lock arrangement.

The present main latch assembly is a basic improvement over the Sandor arrangement. However, it is intended to be utilized with the same type of biaxial multi-hinge and hinge-latch supports disclosed therein. The subject improved main latch assembly permits opening of the tailgate in the door mode with the window in the up or closed position and an externally accessible handle is provided on the tailgate for opening purposes. To provide a non-window oriented locking function a lock mechanism is provided which permits the external handle of the tailgate to "freewheel" without operating the tailgate latch assembly when in locked condition. However, when the tailgate is in an unlocked condition, rotation of the externally accessible handle unlatches the door for opening in the door mode. A key cylinder lock and pop-up lock button are utilized to lock and unlock the main latch assembly.

Therefore, a primary feature of this invention is the provision of an improved main latch assembly actuated by an external handle to open the door in a door mode and which can be locked to permit the handle to freewheel but which can be unlocked to allow the handle to release the door latch assembly for opening in the door mode.

A further feature of this invention is the provision of an improved main latch assembly actuated by a lock cylinder and a door lock button to a locked condition prohibiting a release of the latch mechanism by exterior manipulation of the handle.

Other features of this invention will be more readily apparent from the following detailed description and from the drawings in which.

Figure 1:
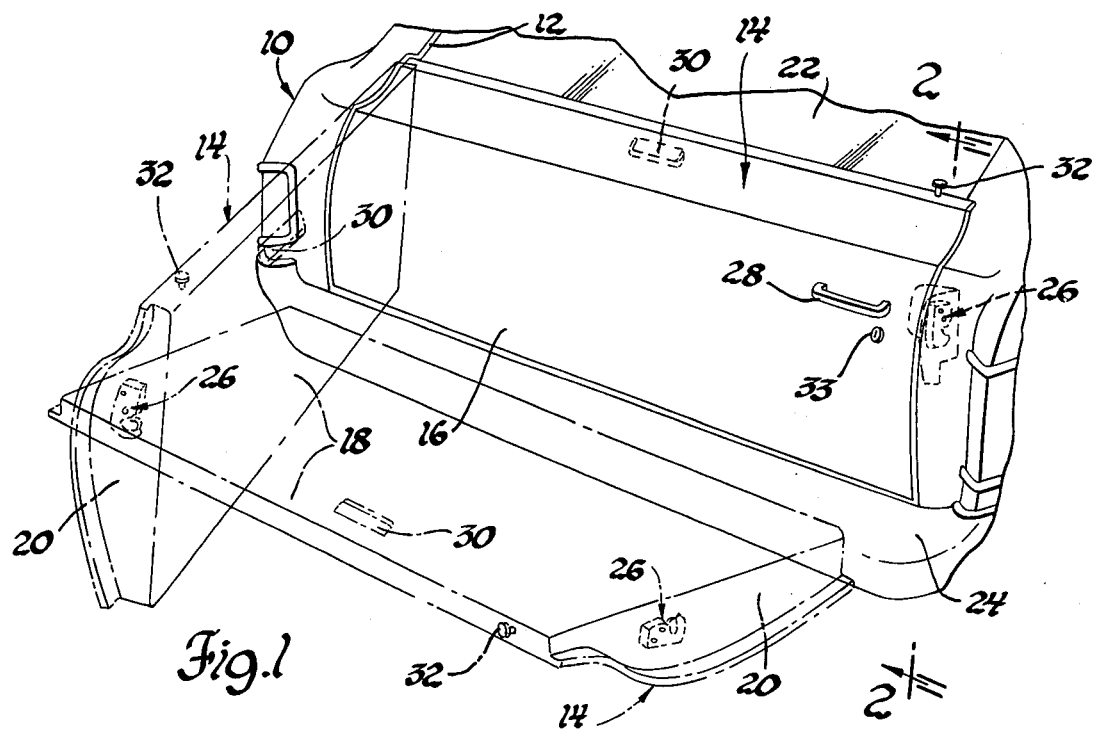
FIG. 1 is a fragmentary perspective view of the rear portion of a station wagon type vehicle showing the tailgate in a closed operative position and with the dual open modes of the tailgate indicated by phantom outlines.

Referring now to FIG. 1 of the drawings, a station wagon type vehicle 10 is shown having a rear compartment with a conventional rear opening 12 thereto. By means to be fully described hereinafter, a closure or tailgate 14 is mounted on the body for swinging movement into and out of the opening 12 about a vertical axis as a door and about a horizontal axis as a drop gate. Tailgate 14 has an outer panel 16, as well as an inner panel 18 joined together in spaced relationship by side panels, the right side panel 20 being visible in FIG. 1. The tailgate 14 supports therein a window panel 22 for closing the remainder of opening 12. The window panel 22 is movable from a closed or raised position, as shown, to a lowered position, wherein it is housed in a recess between the panels 16, 18. A vehicle bumper structure 24 is mounted on the vehicle body below the opening 12.

Reference is hereby made to the above-identified Sandor patent. The tailgate 14 is mounted within opening 12 by a biaxial multi-hinge which supports the lower leftward portion of the door. The upper leftward portion of the door is supported by a selectively releasable hinge-latch member. The lower rightward corner portion of the door is supported by another selectively releasable hinge-latch member. The present invention relates specifically to an improved main latch assembly 26 which supports the upper righthand portion of the door when in the illustrated closed operative condition. The main latch assembly 26 is operably connected to an externally located door mode handle assembly 28 and an interiorly and centrally located drop gate mode handle assembly 30. Also shown in FIG. 1 is a lock button 32 accessible from the interior of the vehicle when the window 22 is raised to place the main latch assembly 26 in a locked mode. A lock cylinder 33 is also utilized so that the window 22 and lock mechanism of the main latch assembly can be operated exteriorly of the vehicle.

Figure 2:
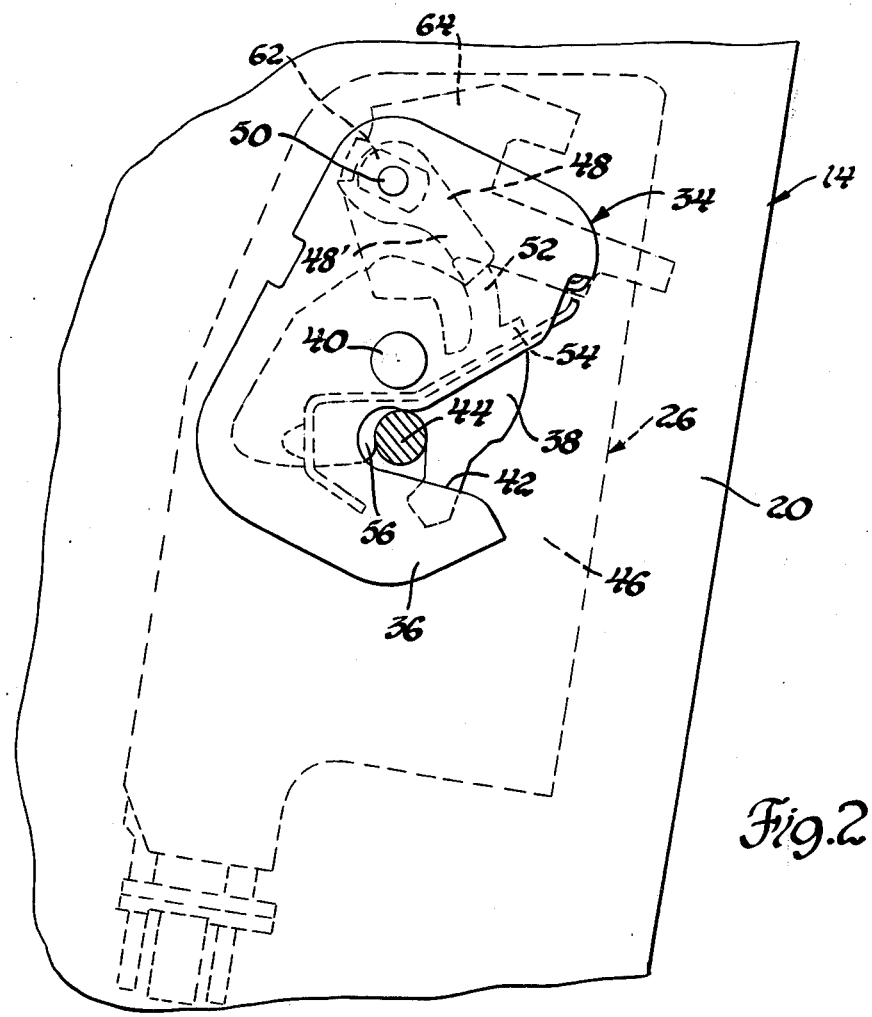
FIG. 2 is a sectional view of the main latch assembly of the present invention taken along section line 2—2 in FIG. 1 and looking in the direction of the arrows.

In FIG. 2 of the drawings, the main latch assembly 26 is shown supported on the far side of side panel 20. Nevertheless, a door latch mechanism generally indicated by numeral 34 protrudes through an opening in the panel 20 and includes a latch bolt housing 36. The latch bolt housing 36 has a similar configuration as disclosed in the previously identified Sandor patent. Like the Sandor latch, a rotatable latch bolt 38 is supported about a shaft 40 which is affixed to the housing 36 and to support plate 46 of the main latch assembly 26. A spring, not visible, encircles the shaft 40 to spring bias the latch bolt 38 toward a clockwise orientation from the position shown in FIG. 2, which represents a latched condition. More details of the door latch portion are available from the Sandor reference and consequentially all details will not be thoroughly discussed but only primary elements will be mentioned.

The latch bolt 38 is held in its latched position of FIG. 2 by a detent lever 48 which is affixed to the end of a shaft 50 which extends through the plate 46. When the shaft 50 and detent lever 48 are rotated counterclockwise in FIG. 2, the end 48' of the detent lever 48 clears shoulder 52 on latch bolt 38 to permit the latch bolt to rotate counterclockwise. A second shoulder portion 54 is also formed in the latch bolt 38 and represents an intermediate position of the latch bolt between closed and fully opened. This feature is discussed in the Sandor patent and represents a safety latch condition. When the door is swung into the closed position from either the drop gate or the door mode, striker 44 is engaged by the mouth portion 42 of housing 36 and then portion 56 of the latch bolt 38 is contacted, causing the latch bolt 38 to pivot clockwise about shaft 40 to the closed or latched position shown in FIG. 2.

Figure 3:
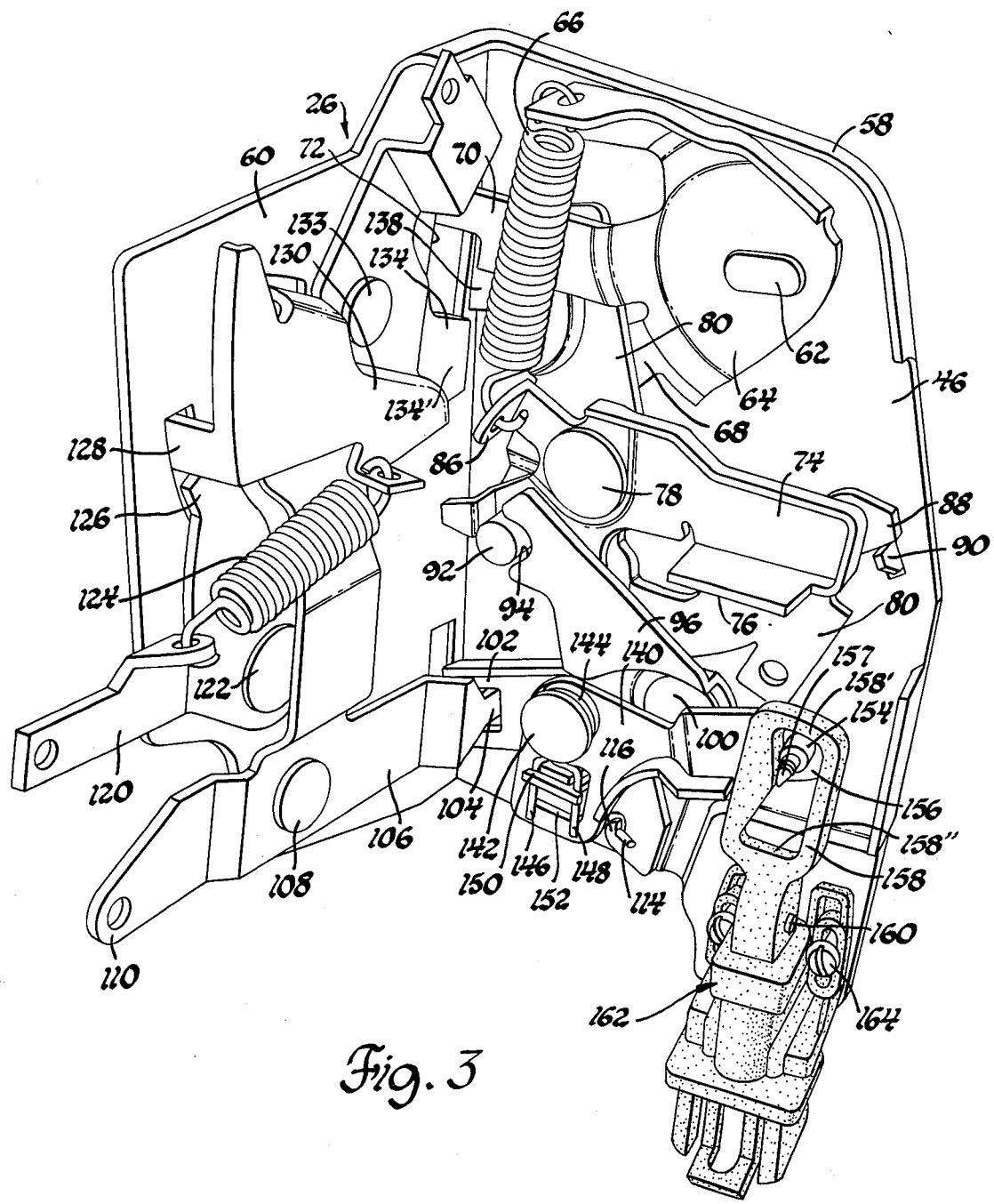
FIG. 3 is a perspective view of the improved main latch assembly as it would look to an observer standing at the rear of the vehicle looking forward and toward the right side of the door.

FIG. 3 shows the main latch assembly 26 in perspective viewed from the opposite side from that shown in FIG. 2. The plate 46 has a turned edge portion 58 to impart rigidity. Also, the plate 46 includes a right angle flange portion 60 integral with the portion 46. Shaft 50 extends through plate 46 and an upset head portion 62 affixes a detent release lever member 64 thereto. When shaft 50 is rotated generally clockwise, as shown in FIG. 3, the detent release lever 64 also rotates clockwise against the restraining action of a spring 66. The recess lever member 64 has an arm 68 extending therefrom adapted to be contacted by means to rotate the detent release lever 64 during a door opening mode of operation. A second arm 70 on member 64 extends towards the flange 60 and through an opening 72 therein. Arm 70 is engaged by means to rotate detent release lever 64 during a drop gate opening mode.

Figure 4:
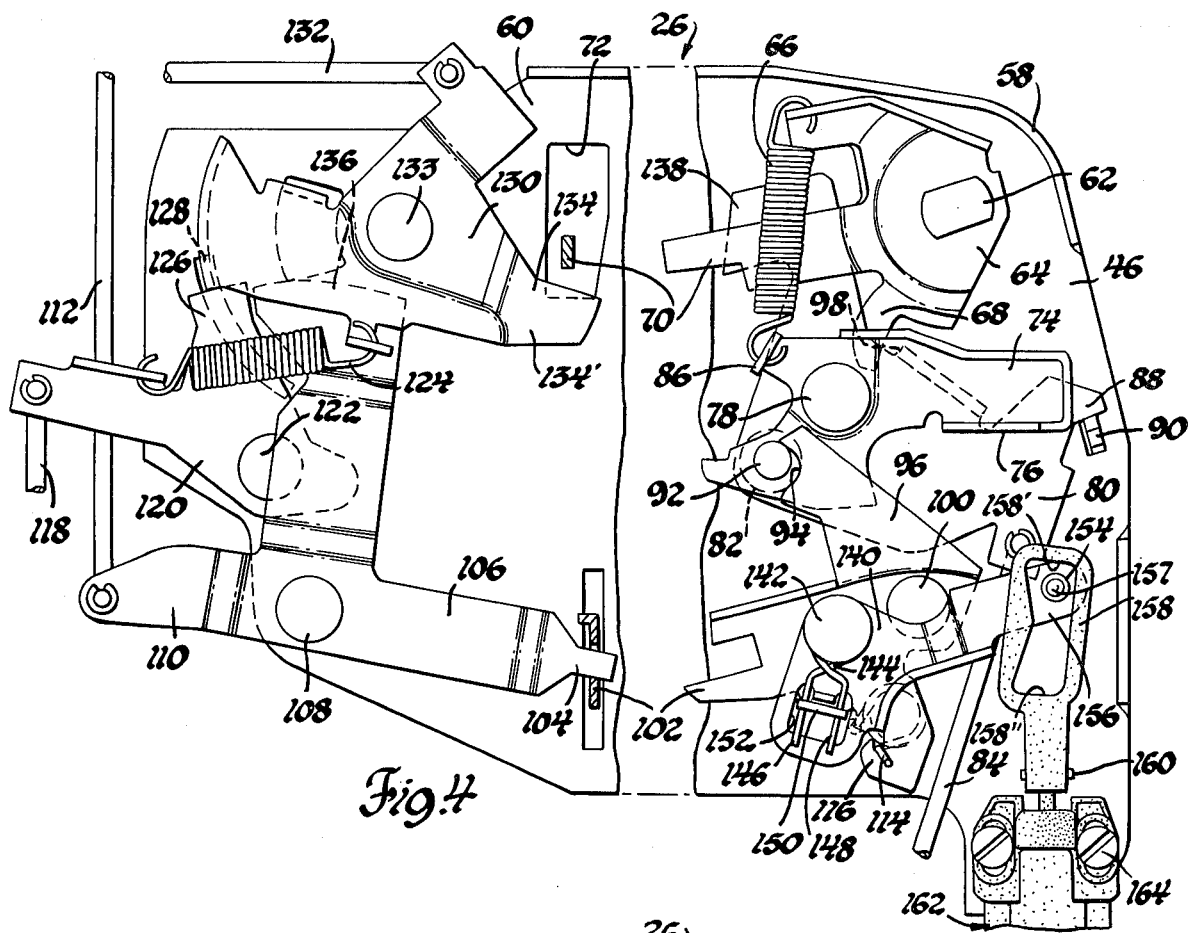
FIG. 4 is an elevational plane view of both faces of the latch assembly when in an unlocked, latched operational condition.

Referring to FIG. 4 of the drawings, the detent release lever 64 is shown in its most counterclockwise position which indicates that the detent lever 48 and latch bolt 38 are in the latched position shown in FIG. 2. When the main latch assembly 26 is operated to open the door in the door mode, a handle-actuated lever member 74 is engaged by a portion of the handle assembly 28 spaced between the outer and inner panels of the door. This interior portion of the handle assembly 28 contacts under surface 76 of the handle lever 74. Handle lever 74 is pivotally fastened by a rivet fastener 78 to a lower lock release lever 80. The lower lock release level 80 is in turn pivotally fastened to the support plate 46 by a rivet fastener 82. As shown in FIG. 4, a control link or rod 84 is attached to a distal portion of the lever 80 so that when lever 80 is rotated counterclockwise or upward in FIG. 4, the control link 84 will release the lower right-hand hinge-latch. Release of the lower right-hand hinge-latch simultaneous with release of the bolt latch 38 permits the door to be swung outward as a door. It should be noted that the lower end of spring 66 engages a flange 86 on the handle lever 74 so as to bias it in a clockwise direction about the rivet fastener 78.

Figure 5:
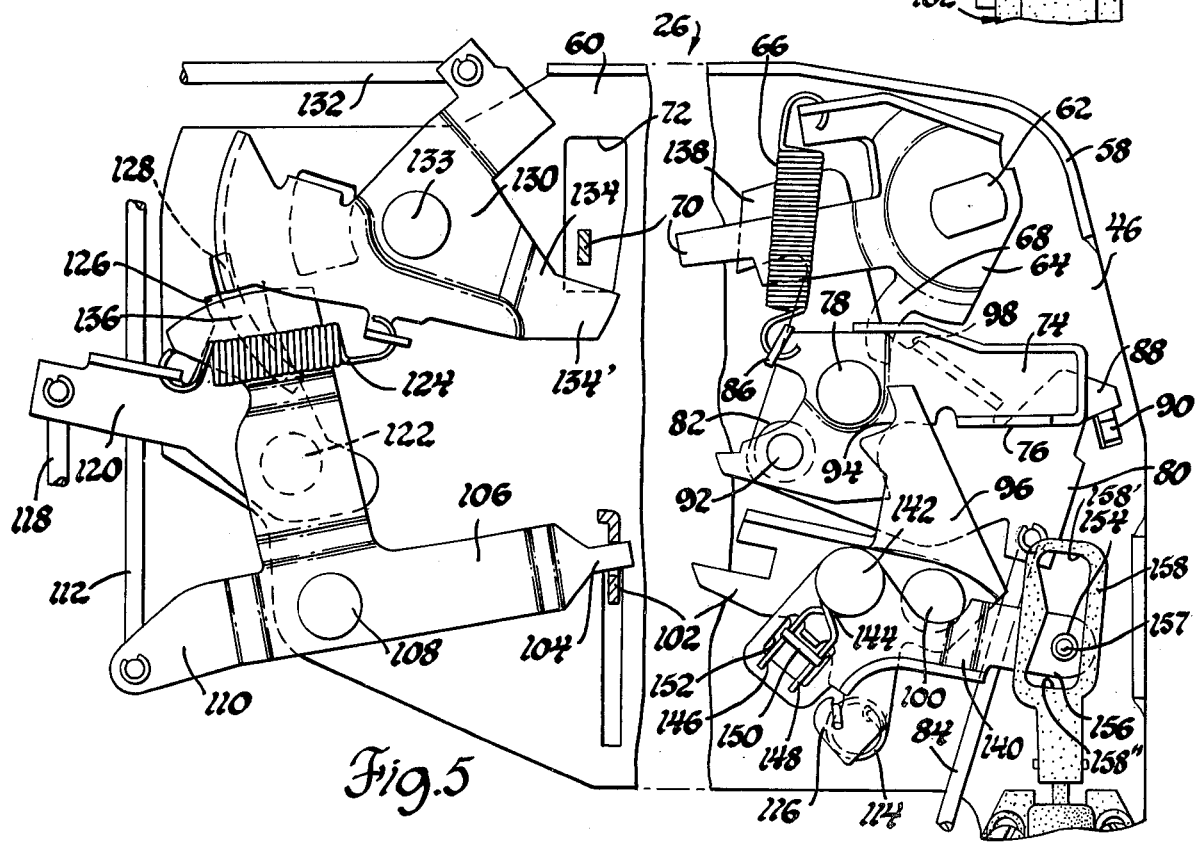
FIG. 5 is a view similar to FIG. 4 but showing the main latch assembly when in a locked, latched operational condition.
Figure 6:
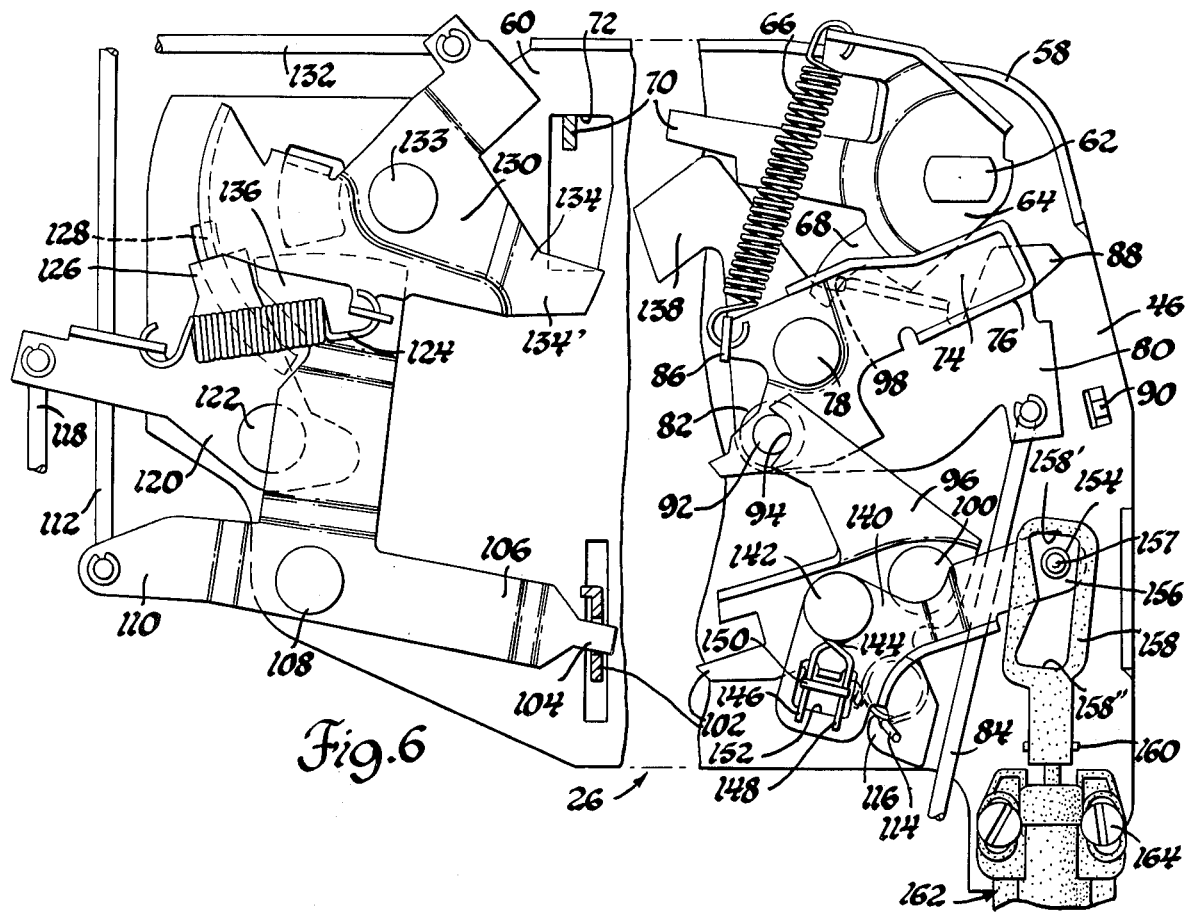
FIG. 6 is a view similar to FIG. 4 but showing the latch assembly when in an unlocked and unlatched operative condition caused by activation of the door mode handle.

The lower lock release lever 80 is pivotal from the positions shown in FIGS. 4 and 5, which represent latched positions to the position shown in FIG. 6, which represents an unlatched position. The lower lock release lever 80 is held in the latched position by contact between a portion 88 and an upwardly projecting stop 90 on plate 46. During rotative actuation of the handle lever 74 in a door mode of operation, the handle member 74 and lower lock release lever 80 must pivot together about the axis of rivet fastener 82. This is accomplished by providing a bearing engagement between an upstanding post or pin 92 on the handle lever 74 and an adjacent semicircular bearing surface 94 formed on a lock trip lever 96. The rivet fastener 78 connecting the handle member 74 and the lower lock release lever 80 holds the members 74, 80 together as rotational movement occurs about the substantially aligned axes of rivet fastener 82 and pivot post 92. The resultant counterclockwise rotation of the handle and lower lock release levers 74, 80 about the axis of fastener 82 causes an upstanding end surface 98 on the lock release lever 80 to contact arm 68 of the detent release lever member 64. This pivots the lever 64 clockwise, thus releasing the detent lever 48 from shoulder 52 of the latch bolt 38 to resultantly release striker 44 from the latch mechanism 34.

The simultaneous rotation of levers 74 and 80 produces resultant rotation of lever 64 and causes spring 66 to stretch so that upon release of the upward opening force on surface 76 of lever 74, the levers 64, 74 and 80 return to their normal latch positions.

Figure 7:
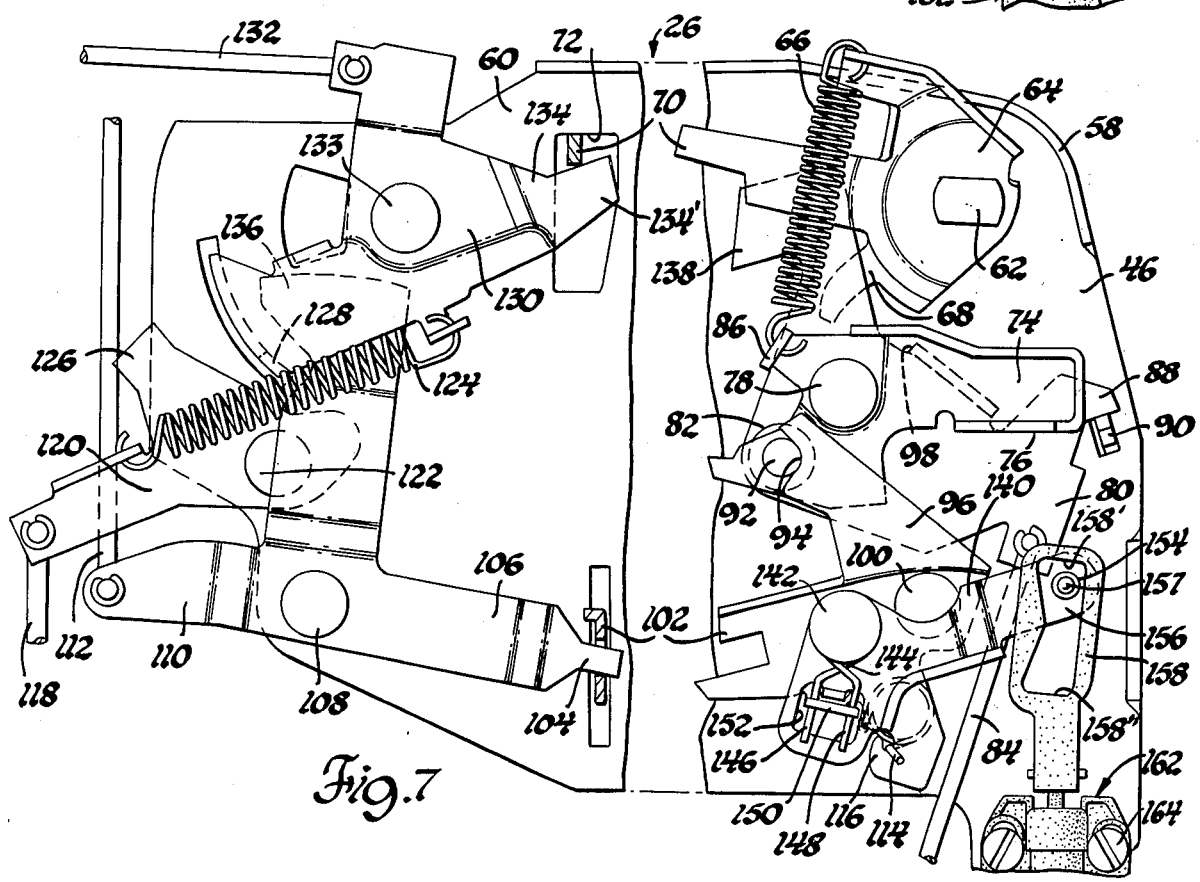
FIG. 7 is a view similar to FIG. 4 showing the main latch assembly when in an unlocked and unlatched operative condition caused by activation of the center handle control.

The aforedescribed operation of the main latch assembly occurs when the lock trip lever 96 is in the unlock position shown in FIGS. 4, 6, 7. However, it is often desirable to lock the tailgate so that the manipulation of the exterior handle 28 does not operate the main latch mechanism. Therefore, the lock trip lever 96 is pivotally mounted on plate support 46 by a rivet fastener 100. The trip lever 96 may be pivoted clockwise from the position shown in FIGS. 4, 6, 7 to the locked position shown in FIG. 5. In the locked position, the cylindrical bearing surface 94 on lever 96 is moved away from the post member 92 about which lever 74 pivots in the door mode of operation. As a consequence, an upward force placed on surface 76 of lever 74 merely causes the lever 74 to pivot about the axis of its rivet fastener 78. Meanwhile, the lower lock release lever 80 is unmoved from its position shown in FIGS. 4, 5, 7. As a consequence, the exterior handle member 28 turns freely between normal and open positions without producing any unlatching action of the latch assembly 26. The movement of lock trip lever 96 clockwise from its unlocked position shown in FIG. 4 to its locked position shown in FIG. 5 is accomplished by engagement between a slotted flange portion 102 of lever 96 and an end portion 104 of a locking lever 106. The locking lever 106 is pivotally fastened by a rivet fastener 108 to the right angle flange portion 60 and is located between the end portion 104 of the lever 106 and an opposite end 110 which is adapted to be connected to the lock button 32 shown in FIG. 1 by a control link of rod 112. The transition between an unlocked and a locked mode of levers 96, 106 is accomplished by counterclockwise rotation of the lever 106 and clockwise rotation of the lever 96 which moves the bearing surface 94 away from the pivot post 92. To help shift movement of the levers 96, 106 into locked and unlocked positions, a coil-shaped torsion spring 114 is placed between a hooked flange portion 116 of lever 96 and the plate 46. By over-center toggling action the spring 114 biases the lever 96 either into an unlocked position shown in FIG. 4 or a locked position shown in FIG. 5.

When the main latch assembly 26 is operated as a drop gate, the window 22 must be lowered to its opened or lowered position so that the operator may engage the center handle assembly 30. To insure that the window is in its fully open or lowered position, a window position means including a control rod or link 118 is utilized in the manner described in the Sandor patent. Specifically, the lower end of the rod 118 is hooked so as to be engaged by the lower edge of window 22 as it moves into its open position, causing the control rod 118 to move downward from the position shown in FIG. 4 to the open window position shown in FIG. 7. The downward movement of the link 118 rotates a window blockout lever 120 about the axis of a rivet fastener 122 attached to plate 60. A spring 124 normally biases the lever 120 and rod 118 to be raised window position. A flange portion 126 of lever 120 is located to interfere with a portion 128 of a remote control lever member 130 when the window is raised. The remote control lever 130 is connected by a control link or rod 132 to the centrally positioned handle assembly 30. Operation of the handle assembly 30 causes lever 130 to pivot counterclockwise about rivet fastener 133 from the position shown in FIG. 4 to the position shown in FIG. 7, which represents an unlatched drop gate mode position. Moving into the unlatched position, an extended portion 134 of lever 130 moves upward and engages the extended flange portion or arm 70 of the detent release lever and causes rotation of the shaft 50 in the clockwise direction of FIG. 7. Rotation of the shaft 50 moves the end 48' of the detent lever 48 to a remote position with respect to shoulder 52, consequently releasing the latch bolt 38 from engagement with striker 44. As fully explained in Sandor, operation of the handle assembly 30 also causes the simultaneous release of the upper lefthand hinge-latch so that the tailgate 14 is free to pivot downward in the drop gate mode about its substantially horizontal axis.

From the above description, it is obvious that actuation of the tailgate in the drop gate mode by operation of the central handle assembly 30 is prevented when the window is raised by the position of window blockout lever 120. Portion 126 interferes with movement of lever 130 when the window is raised. Likewise, it is desirable to prevent movement of the remote lever 130 when the tailgate is in the locked mode, as shown in FIG. 5. Therefore, a blockout extended portion 136 of lock lever 106 is provided. When the lever 106 is rotated from its unlocked position shown in FIG. 4 to a locked position in FIG. 5, the blockout portion 136 moves to the left to interfere with portion 128 of the remote control lever 130. Thus, actuation of the drop gate handle assembly 30 will not rotate lever 130.

It is essential that actuation of the exterior door mode handle 28 does not permit simultaneously releasing both the upper left hinge-latch and the lower right hinge-latch. Therefore, as shown in FIG. 6, a hooked "keeper" portion 138 on the lower lock release lever 80 moves to the left with counterclockwise rotation of lever 80 to engage and thereafter prevent unlatching movement of arm portion 134 of lever 130. Thus, simultaneous rotation of the lower latch release lever 80 and the remote control lever 130 is prevented. Likewise, when the remote control lever 130 is rotated counterclockwise by actuation of drop gate handle assembly 30, the back face 134' of lever 130 blocks movement of portion 138 and prevents rotation of lever 80.

The lower right-hand corner of the latch assembly shown in FIG. 3 discloses a key-actuated lock and window control mechanism explained hereinafter. A key lock actuated lever or key lever 140 is pivotally mounted about an upstanding fastener 142 which extends through a pivot hold in lever 140 and is secured to the lock trip lever 96. A coil-shaped torsion spring 144 encircles the fastener 142 and has two legs 146, 148 extending therefrom. Legs 146, 148 engage a T-shaped flange 150 which extends from lever 96 through an opening 152 in the key lever 140. Interaction between legs 146, 148 and the flange portion 150 centers the flange 150 in opening 152. Rotation of the key lever 140 by actuating a lock cylinder (33 in FIG. 1) causes rotation of the key lever 140 either clockwise or counterclockwise. This moves the connected lock trip lever 96 between locked and unlocked positions. For purposes of connecting the key lever 140 and the lock cylinder 33, a projecting boss 154 is attached to the distal end 156 of key lever 140. A control rod or link (not shown) connects the lock cylinder and the tip portion 157 of boss 154. Operation of the window 22 by an electric operator is also controlled by the actuation of the lock cylinder 33. When the key is turned to extreme positions in either direction, the boss 154 moves to engage an upper part 158' or a lower part 158" of encircling member 158. A pin connection 160 attaches member 158 to a double throw electrical switch assembly 162 which actuates the window operator to raise and lower the window 22. The switch assembly 162 is fastened to plate 46 by fasteners 164. Movement of the boss 154 by window operation of the lock cylinder past the lock or unlock position of lever 96 is accommodated by lost motion of key lever 140 on lever 96 as spring 144 is flexed.

Although the embodiment illustrated and described in detail above is a preferred embodiment, other embodiments may be adapted without falling outside the scope of the following claims which define the invention.

What is claimed is as follows:

1. In a vehicle with a tailgate-type door, alternately pivotal about a substantially vertical axis in a door mode of operation and about a substantially horizontal axis in a drop gate mode of operation, having door supports including a multi-axis hinge at one corner of the door, and first and second alternately releasable hinge-latches, one of each located at door corners adjacent to the multi-axis hinge, a main latch assembly for securing the door at a corner location diametrically opposite the multi-axis hinge and being releasable during both modes of operation while simultaneously releasing either of the two hinge-latches, comprising:

a pivotally mounted latching member movable between a door unlatched position in which the door is open, and a door latched position in which a portion of the vehicle is engaged to maintain the door in a closed condition, latch release means including an arm pivotal between a first position engaging said latching member to hold it in its latched position and a second position out of engagement with said latching member, permitting it to rotate to its unlatched position, a pivotally mounted hinge-latch release lever operably connected to one of said hinge-latches and movable between latched and unlatched positions for releasing the one hinge-latch, thereby permitting the tailgate door to open in the door mode of operation, connecting means between said hinge-latch release lever and said latch release means to produce unlatching movement of the latch release arm as the hinge-latch release layer rotates from its latched to its unlatched operative position, a lever supported for pivotal movement on said hinge-latch release lever about an axis offset from the rotational axis of said hinge-latch release lever and adapted to be actuated by a handle mounted on said door, thereby permitting independent rotation of said handle-actuated lever with respect to said hinge-latch release lever without corresponding rotation of said hinge-latch release lever and said connected latch release means, selectively operable lock means including a member pivotally moved to an unlocked position into engagement with said handle-actuated lever and in alignment with the axis of said hinge-latch release lever to produce simultaneous rotational movement of said handle-actuated lever and said hinge-latch release lever, thereby moving said latch release means to its unlatched position.

2. In a vehicle with a tailgate type door, alternately pivotal about a substantially vertical axis in a door mode of operation and about a substantially horizontal axis in a drop gate mode of operation, having door supports including a multi-axis hinge at one corner of the door, and first and second alternately releasable hinge-latches, one of each located at corners adjacent to the multi-axis hinge, a main latch assembly for securing the door at a corner location diametrically opposite the multi-axis hinge and being releasable during both modes of operation while simultaneously releasing either of the two hinge latches, comprising:

a pivotally mounted latching member movable between a door unlatched position in which the door is open, and a door latched position in which a portion of the vehicle is engaged to maintain the door in a closed condition, latch release means including an arm pivotal between a first position engaging said latching member to hold it in its latched position and a second position out of engagement with said latching member, permitting it to rotate to its unlatched position, a pivotally mounted hinge-latch release lever operably connected to one of said hinge-latches and movable between latched and unlatched positions for releasing one hinge-latch, thereby permitting the tailgate door to open in the door mode of operation, connecting means between said hinge-latch release lever and said latch release means to produce unlatching movement of the latch release arm as the hinge-latch release lever rotates from its latched to its unlatched operative position, a lever supported for pivotal movement on said hinge-latch release lever about an axis offset from the rotational axis of said hinge-latch release lever and adapted to be actuated by a handle mounted on said door and thereby permitting independent rotation of said handle-actuated lever with respect to said hinge-latch release lever as the handle is roated without corresponding rotation of said hinge-latch release lever, said handle actuated lever having a cylindrical portion thereon projecting from the plane of the lever, selectively operably lock means including a movable portion in overlying relation to said handle actuated lever and proving a semi-cylindrical bearing surface thereon for engagement with said projecting cylindrical portion on said handle-actuated lever when in an unlocked position, thereby producing simultaneous rotation of said handle-actuated lever and said hinge-latch release lever to cause rotation of said latch release means and unlatching of the latching member.

3. A main latch assembly for a tailgate type door which can be alternately pivoted about a substantially vertical axis in a door mode of operation and about a substantially horizontal axis in a drop gate mode of operation, comprising:

a support adapted to be attached to the tailgate, a latching member pivotally mounted on said support and movable between a door unlatched position in which the door is open, and a door latched position in which a portion of the vehicle is engaged to maintain the door in a closed condition, latch release means including an arm pivotal between a first position engaging said latching member to hold it in its latched position and a second position out of engagement with said latching member, permitting it to rotate to its unlatched position, a hinge-latch release lever poivotally mounted on said support and movable between latched and unlatched operative positions, connecting means between said hinge-latch release lever and said latch release means to move said latch release arm to its unlatching position as the hinge-latch release lever rotates between its latched and its unlatched operative positions, a lever supported for pivotal movement on said hinge-latch release lever and adapted to be actuated by a handle mounted on said door to permit independent rotation of the handle-actuated lever thereon about an axis offset from the rotational axis of said hinge-latch release lever, a selectively operable lock means including a movable portion in overlying relation to said handle-actuated lever, means between said handle-actuated lever and said movable lock portion for providing a pivotal connection therebetween when in an unlocked condition with an axis of rotation substantially in alignment with the axis of said hinge-latch release lever, whereby rotation of the handle-actuated lever in an unlocked mode of operation produces simultaneous rotation of the hinge-latch release lever about the axis of its pivotal mount to said support and resultantly releases the latch release means to permit unlatching of the latching member.

4. The main latch assembly set forth in claim 3 in which the pivotal connecting means between said handle-actuated lever and said hinge-latch release lever is formed by a protruding and generally cylindrical post formed in one of the levers and a semi-cylindrical bearing portion formed in the other of the levers.

* * * * *